June 17, 1924.

H. H. ALLYN

SELF SEALING TIRE TUBE

Filed Nov. 5, 1923

1,498,143

ON LINE 2-2.
FIG. I.

INVENTOR
Harley H. Allyn
BY
J. Bonsall Taylor
Herbert S. Fairbanks
ATTORNEYS

Patented June 17, 1924.

1,498,143

UNITED STATES PATENT OFFICE.

HARLEY H. ALLYN, OF PHILADELPHIA, PENNSYLVANIA.

SELF-SEALING TIRE TUBE.

Application filed November 5, 1923. Serial No. 672,956.

*To all whom it may concern:*

Be it known that I, HARLEY H. ALLYN, a citizen of the United States, residing at Philadelphia, county of Philadelphia, State of Pennsylvania, have invented a new and useful Self-Sealing Tire Tube, of which the following is a specification.

My present invention comprehends a novel construction of a self sealing inner tube for automobile shoes or outer casings, whereby in case of puncture the opening made will be effectively closed and sealed when the nail or other device which causes the puncture is withdrawn.

It further comprehends a novel self sealing inner tube having two layers of vulcanized rubber between which is disposed a layer of rubber which is unvulcanized or only partly vulcanized. The inner layer of vulcanized rubber has on its inner face a layer of unvulcanized rubber which extends throughout the tread portion and to a desired height of the sides.

In my prior Patent No. 1,398,482, dated Nov. 29, 1921, I have described and claimed a self sealing inner tube of this type in which the inner layer of self sealing material, such as, for example, unvulcanized rubber, is covered with paper. It has been found in practice that paper has disadvantages, namely, it is liable to curl up so that the self sealing material and also the inner layer of vulcanized rubber overlaps it; the particles of the paper strip off and are drawn into the opening of the puncture when the article which causes the puncture is withdrawn; and the self sealing material dries out. I have found after numerous experiments that if the inner layer of self sealing material is covered on its inner face with tin foil that the foregoing objections are eliminated.

My present invention thus comprehends a novel self sealing inner tube having an inner layer of self sealing material which is covered on its inner surface with tin foil.

Other novel features of construction and advantage will hereinafter more clearly appear in the detailed description and the appended claims.

For the purpose of illustrating my invention I have shown in the accompanying drawing a preferred embodiment of my invention which, in practice, will give satisfactory results.

Similar numerals of reference indicate corresponding parts.

Referring to the drawings:—

Figure 1:
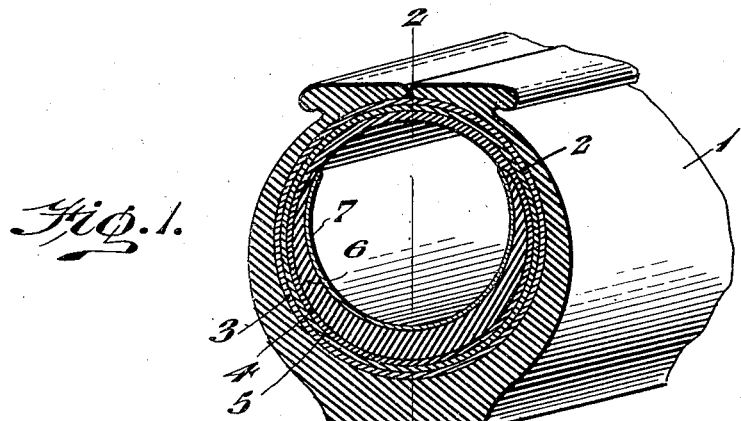
Figure 1 is a transverse section of a conventional tire, in conjunction with which a self sealing inner tube embodying my invention is employed.
Figure 2:
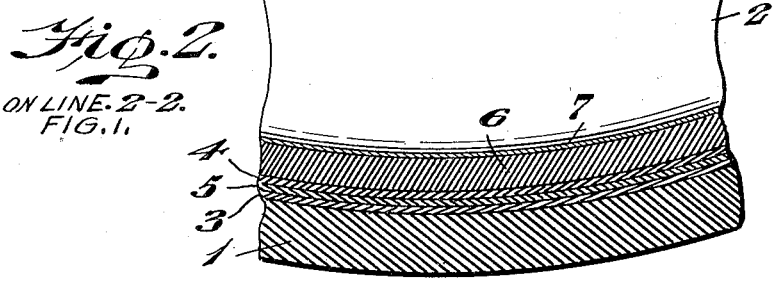
Figure 2 is a section on line 2—2 of Figure 1.
Figure 3:
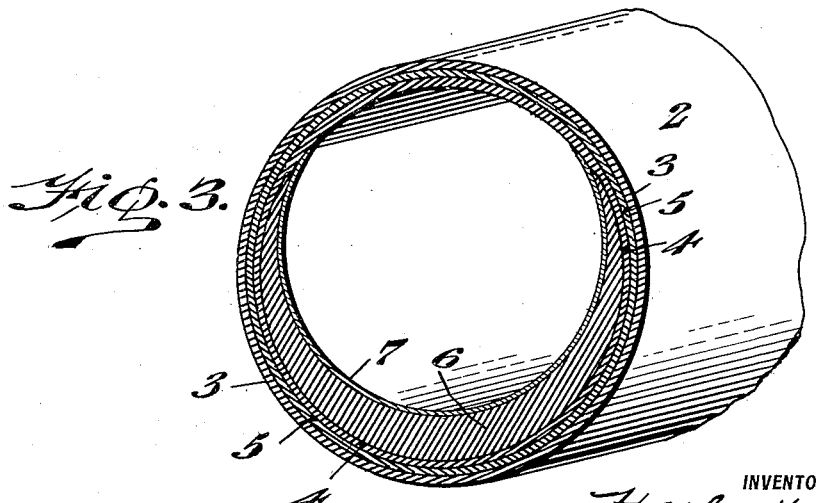
Figure 3 is a transverse section of the self sealing inner tube.

1 designates an outer shoe or tire casing of any desired or conventional type, and 2 designates a self sealing inner tube embodying my invention. The tube 2 has a plurality of plies or layers. 3 designates an outer layer of vulcanized rubber, and 4 designates a similar inner layer of vulcanized rubber. Between these two layers is disposed a ply or layer 5 of self sealing material such as unvulcanized or partly vulcanized rubber and which preferably is annular in cross section. The inner layer 4 has on its inner face throughout the tread portion and also preferably extending up the sides a layer 6 of self sealing material, which is preferably a soft plastic composition. The inner face of this layer 6 is covered with tin foil 7. If the tube is punctured the tin foil does not strip off but breaks up into small particles, which, if drawn into the hole formed by the puncture, does not interfere with the sealing of the hole by the self sealing material which is drawn through the hole by the withdrawal of the article which caused the puncture. This tin foil when initially applied adheres closely to the self sealing material and does not curl up as does paper so that the juxtaposed layers do not lap over the tin foil during the process of manufacture. The tin foil also has the advantage of retarding the drying out of the self sealing material 6, with consequent deterioration in its self sealing qualities.

It will now be apparent that I have described a novel and useful self sealing inner tube which embodies the features of advantage set forth in the statement of invention and the detailed description, and while I have, in the present instance, shown and described a preferred embodiment thereof which will give in practice satisfactory and reliable results, it is to be understood that this embodiment is susceptible of modification in various particulars, within the scope of the appended claims, without departing from the spirit and scope of the invention or sacrificing any of its advantages.

Having thus described my invention, what I claim as new and desire to secure by Letters Patent is:

1. An inner tube having on its inner surface throughout its tread portion a layer of soft plastic composition with tin foil on its inner surface to prevent sticking and retard the drying of said composition.

2. An inner tube, having a plurality of layers of vulcanized material with a layer of sealing material between them, with a layer of non-vulcanized sealing material on the inner face of the inner layer of vulcanized material throughout the tread bearing portion, and with tin foil on the inner surface of said layer of non-vulcanized sealing material.

HARLEY H. ALLYN.

Witnesses:
H. S. FAIRBANKS,
M. FILBERG.